UNITED STATES PATENT OFFICE 2,209,722

PLASTIC COMPOSITION FOR LINING PRESSURE VESSELS

Gale L. Adams and Charles W. Starkey, Los Angeles, and Park Woolley, Huntington Park, Calif., assignors to Socony-Vacuum Oil Company, Incorporated, New York, N. Y., a corporation of New York No Drawing. Application April 9, 1937, Serial No. 135,982

3 Claims. (Cl. 106—96)

The object of our invention is to provide a corrosion resisting lining for pressure vessels exposed to contact with petroleum vapors and particularly with vapors containing sulphur and acidic organic gases.

In the thermal decomposition of petroleum products which contain even traces of sulphur the tubes of the furnace become internally coated with a so-called "coke" which actually consists in large part of ferrous sulphide (FeS) and only in small part of carbon.

Where such sulphur containing products are being thermally treated, it is common practice to introduce small quantities of lime (as for example, more or less ½ pound per barrel) into the liquid feed. When this step is practiced, the incrustation consists in large part of calcium monosulphide (CaS) and in smaller proportions of ferrous sulphide and carbon. This deposit of ferrous sulphide very frequently is the result of iron removed in subsequent fractionating equipment and returned to the furnace by the recycle.

The analyses of illustrative samples of two such incrustations are as follows, the figures in the first column being for a deposit accumulating in a furnace used in reforming distillate from California crude without the use of lime, while the second column refers to a deposit accumulating under the same conditions except that 0.4 pound lime per barrel of charging stock was used:

|  | Percent | Percent |
|---|---|---|
| FeS | 75 | 10 |
| CaS | 0 | 60 |
| CaO | 0 | 8 |
| Carbon (uncombined) | 15 | 11 |
| Organic (bituminous) | 10 | 11 |

We have discovered that when either of these materials is finely comminuted, mixed with Portland or other water-setting cement and water in suitable proportions, and applied as a plastic lining to pressure vessels of the class described, the lining is highly resistant to corrosion by sulphurous or acidic organic vapors and has substantially the same coefficient of expansion as the metal to which it is applied.

We have found by experiment that from 2 to 5 portions of the comminuted incrustation should be mixed with 1 portion of the cement. The incrustation should contain not less than 40% by weight of FeS+CaS and not more than 60% of organic (bituminous) material+CaO+Carbon (uncombined), and the proportion of CaO+Carbon should not exceed 20% of the weight of the incrustation.

The mixture should be made up with sufficient water to be applied with the well known cement gun. When so applied, it forms a firm bond with a clean metal surface if held firmly against that surface during the setting period. To maintain such contact on vertical surfaces we prefer to tack a relatively fine mesh metallic screen (say ¼" mesh) to the surface, spacing it from ⅛" to ¼" from the surface to be covered, and then to apply the plastic with a gun until the screen is just covered. The plastic may, if desired, be applied by trowelling, but with more difficulty and usually with the production of a less permanent lining.

Linings prepared and placed in this manner are firmly bonded to the metal, are not dislodged by differential expansion and withstand the corrosive action of the vapors for long periods. As such linings are somewhat resistant to the passage of heat, they are not recommended nor are they suitable for application to heat-transmitting surfaces such as the tubes of condensers or interchangers, though they may desirably be applied to the shells of such vessels, to dephlegmators, soaking chambers, and other vessels in which petroleum vapors are maintained at elevated temperatures.

While we prefer to use the incrustations accumulating in thermal cracking tubes as above described, we may, in the absence of such incrustations, substitute artificial mixtures of ferrous sulphide or calcium sulphide both with free carbon and bituminous matter in the proportions above stated. In such substitution it is highly desirable to grind the constituents of the mixture to pass a 20 mesh screen before mixing them with the cement.

We claim as our invention:

1. A plastic composition comprising: 2 to 5 parts of a comminuted form of the hard, dense incrustation found in equipment wherein petroleum has been thermally decomposed, said incrustation containing at least 40 per cent by weight of sulphides of calcium and iron; 1 part of a water-setting cement; and water to form a fluent mass.

2. A plastic composition substantially as described in claim 1, in which the maximum total free carbon and calcium oxide content of said incrustation is 20 per cent by weight.

3. A plastic composition comprising: 2 to 5 parts of a comminuted form of the hard dense incrustation found in equipment wherein petroleum has been thermally decomposed; 1 part of a water-setting cement and water to form a fluent mass, said incrustation containing at least 40% by weight of iron sulphides deposited during such thermal decomposition.

GALE L. ADAMS.
CHARLES W. STARKEY.
PARK WOOLLEY.